Patented Dec. 23, 1924.

1,520,487

UNITED STATES PATENT OFFICE.

FRANK J. TONE, OF NIAGARA FALLS, NEW YORK, ASSIGNOR TO THE CARBORUNDUM COMPANY, OF NIAGARA FALLS, NEW YORK, A CORPORATION OF PENNSYLVANIA.

REFRACTORY ARTICLE.

No Drawing.   Application filed March 5, 1924.   Serial No. 697,027.

*To all whom it may concern:*

Be it known that I, FRANK J. TONE, a citizen of the United States, residing at Niagara Falls, county of Niagara, and State of New York, have invented a new and useful Improvement in Refractory Articles, of which the following is a full, clear, and exact description.

This invention relates to refractory articles such as bricks, furnace linings, etc., formed of fused alumina-silica material, produced by the treatment of aluminum silicate and containing alumina and silica. This material may be produced by the process described in detail in United States Patent No. 906,339, of December 8, 1908, to Frank J. Tone.

Compounds of alumina and silica, as for example clay, have been long used for refractory material in the form of bricks, furnace blocks, etc. The usual method of making such articles consists in calcining a portion of the clay material, to remove water and cause the material to shrink, after which raw clay and water are added to form a plastic mix which is formed into desired shapes by one of several well known methods. The shaped pieces are then dried and fired in a ceramic kiln to a fairly high temperature. Refractory shapes made in this manner are satisfactory for the usual furnace conditions, but when subjected to high temperatures for a long time they continue to shrink and decrease in volume, causing cracks and eventually destroying the furnace structure.

It has been proposed that clay, of approximately kaolinite in composition $Al_2O_3 2SiO_2$ 46% $Al_2O_3$), be reduced to its ultimate volume by actual fusion in the electric furnace, thereby avoiding the deleterious shrinkage of the usual form of aluminum silicate firebricks. It has been found, however, that this fusion causes a decomposition resulting in the separation of fused silica glass and an aluminum silicate of higher content than 46% $Al_2O_3$. This fused clay material is quite unsatisfactory for refractory purposes because of the differences in coefficient of expansion of the fused silica glass and the aluminum silicate compound. By increasing the alumina content by the process described in United States Patent No. 906,339, referred to above, a fused product containing between 5% and 35% silica is produced which does not have the objectionable properties above referred to and which may be successfully used for making refractory shapes.

The alumina-silica material should be as free as possible from metallic impurities. I prefer to use the product in crushed form, preferably of a mixture of grains from about 8 mesh up to the finest powders. I have found that bricks made of grit mixtures giving the greatest apparent density and lowest porosity have superior properties.

The bonding material which I prefer to use consists of finely divided alumina and silica in the proportions to give the same alumina-silica ratio as in the fused grains. I do not restrict myself, however, to this exact mixture, as other materials such as clay and other alumina-silica compounds have been successfully used. A relatively small amount of this binder may be used.

In the bonding of refractory materials consisting of highly shrunk refractory oxides such as the alumina-silica material herein described, great difficulty has been encountered in getting an article of low porosity and good crushing strength, and I have discovered that the mixture of grain sizes is of the utmost importance in this result. In carrying out my invention I preferably use the alumina-silica material containing about 25% silica, crushed to a mixture of grit sizes containing approximately 40% from 8 mesh to 36 mesh, 20% from 40 mesh to 76 mesh, and 40% 80 mesh and finer. I prefer to use an alumina-silica compound as a binder and have had successful results in mixing with these grains, preferably 15% of a finely ground intimate mixture of 100 parts calcined kaolin ($Al_2O_3 2SiO_2$) and 116 parts of aluminum oxide. This mixture is moistened with the correct amount of water to give proper working properties, molded into the desired shapes, dried and fired to a temperature of at least 1500° C.

While throughout this specification I have mentioned only the chemically pure materials, I do not restrict myself to these, since the commercially available products containing small amounts of impurities may be used.

I claim:

1. A refractory article containing grains of homogeneous fused product consisting of alumina and silica, said material being substantially free from basic impurities and containing more than 5% and less than 35% silica, said grains being of such mixture of sizes to give in the fired article a low porosity, and a bonding material consisting of an alumina-silica compound of approximately the same composition as the fused grains.

2. A refractory article containing grains of homogeneous fused product consisting of alumina and silica, said material being substantially free from basic impurities and containing more than 5% and less than 35% silica, said grains being of such mixture of sizes to give in the fired article a low porosity, and a bonding material consisting of an alumina-silica compound of approximately the same composition as the fused grains, said article having a vitrifying temperature of at least 1500° C.

In testimony whereof I have hereunto set my hand.

FRANK J. TONE.